United States Patent [19]

Kakizaki et al.

[11] 4,412,938

[45] Nov. 1, 1983

[54] SEMICONDUCTING RESIN COMPOSITIONS

[75] Inventors: Tetsuji Kakizaki; Toshikazu Mizutani, both of Yokkaichi, Japan

[73] Assignee: Mitsubishi Petrochemical Company Limited, Tokyo, Japan

[21] Appl. No.: 198,922

[22] Filed: Oct. 20, 1980

[30] Foreign Application Priority Data

Oct. 29, 1979 [JP] Japan ................................ 54-139492

[51] Int. Cl.$^3$ ......................... H01B 5/16; C08K 3/04
[52] U.S. Cl. ..................................... 252/511; 524/504;
525/83; 525/84; 525/85; 174/102 SC; 174/105 SC; 174/106 SC; 428/375
[58] Field of Search .......................... 260/42.47, 42.52;
525/83, 84, 85; 174/102 SC, 105 SC, 106 SC; 252/511; 428/375; 524/504

[56] References Cited

U.S. PATENT DOCUMENTS

| | | | |
|---|---|---|---|
| Re. 28,336 | 2/1975 | Dalton | 252/511 |
| 3,162,696 | 12/1964 | Zimmerman et al. | 525/301 |
| 3,178,384 | 4/1963 | Rice et al. | 260/28.5 |
| 3,218,373 | 11/1963 | Salyer | 525/193 |
| 3,547,756 | 12/1970 | Oberst et al. | 525/264 |
| 3,562,090 | 2/1971 | Oberst et al. | 428/213 |
| 3,684,821 | 8/1972 | Miyauchi et al. | 174/106 SC |
| 3,849,345 | 11/1974 | Snavely | 252/511 |
| 3,862,056 | 1/1975 | Hartman | 260/42.36 |
| 4,064,198 | 12/1977 | Zeitler et al. | 525/85 |

FOREIGN PATENT DOCUMENTS

44-26186 11/1969 Japan .................................. 525/85

OTHER PUBLICATIONS

Sneed et al., "Comprehensive Inorganic Chemistry", pp. 18-24.
Derwent Abst. 90094 B/50 (11-1-79) J54140992 Hitachi Cable "Conductive Compsni . . . ".
Derwent Abst. 35038 Y/20 (4-1-77) (J52042295) Nippon Kokven Kogyo "Thermoplastic Resin . . . ".
Derwent Abst. 35515 Y/20 (4-8-77) (J52045091) Nippon Kokven Kogyo "Flexible Sheet . . . ".
Derwent Abst. 53279 Y/30 (6-15-77) (J52071694) Nippon Unicar KK "Semiconductive Resin Comps . . . ".

*Primary Examiner*—Lewis T. Jacobs
*Assistant Examiner*—Herbert J. Lilling
*Attorney, Agent, or Firm*—Robert E. Burns; Emmanuel J. Lobato; Bruce L. Adams

[57] ABSTRACT

A semiconducting resin composition comprises: (A) 100 to 40 parts of a modified ethylene-vinyl acetate copolymer prepared by graft processing of 100 parts of an ethylene-vinyl acetate copolymer of a vinyl acetate content of less than 35 percent with 25 to 200 parts of an aromatic vinyl monomer; (B) 0 to 60 parts of a rubber; and (C) 3 to 150 parts of a carbon black with respect to 100 parts of the above described components (A) and (B), all quantities in "parts" and "percent" being by weight. A composition of this character has excellent characteristics for its use in forming the outer semiconducting layer of polyethylene-insulated cables.

4 Claims, No Drawings

SEMICONDUCTING RESIN COMPOSITIONS

BACKGROUND OF THE INVENTION

This invention relates generally to an improved material suitable for the outer semiconducting layer of high voltage cables having layered insulations. More specifically, the invention concerns semiconducting compositions which make possible the production of insulated cables of the character referred to above in which the insulating layer and the outer semiconducting layer are normally in a state of intimate contact with each other, and, moreover, the outer semiconducting layer can be readily stripped off in accordance with necessity.

Heretofore, in a high voltage insulated cable, semiconducting layers are formed as inner and outer layers of the insulation structure for the purpose of moderating the electric field. In order to prevent corona discharge, it is necessary that these semiconducting layers be in intimate contact with or intimate adhesion to the insulating layer in the insulation structure without any gap therebetween. However, excessive adhesion between the outer semiconducting layers and the insulating layer in the insulation structure will give rise to problems such as great difficulty in removing the outer semiconducting layer from the insulation structure in the case where, for example, two lengths of the cable are to be spliced, whereby the stripping-off work requires a long time and can cause damage to the insulating layer in the structure. Thus, cable terminal work requires much time, labor, and skill.

Semiconducting layers having ethylene-vinyl ester copolymers as their base resins, which have heretofore been considered to be the best materials for semiconducting layers of the instant kind, have the property of adhering very strongly to olefin polymers constituting the insulating layer in the insulation structures of cables. For this reason, these layers have almost no strippability from the insulating layer, whereby these semiconducting layers have made cable terminal work extremely difficult.

Representative examples of materials proposed for semiconducting layers known in the prior art are as follows.

(1) Ethylene-vinyl ester copolymers such as an ethylene-vinyl acetate copolymer (of high vinyl acetate content, hereinafter referred to as "high VAc content EVA") or ethylene-unsaturated carboxylate copolymers such as an ethylene-ethyl acrylate copolymer having carbon black dispersed therein.

(2) Halogen-containing resins such as chlorinated polyethylene, chlorosulfonated polyethylene, EVA-vinyl chloride graft copolymer, chlorinated polyethylenevinyl chloride graft copolymer, polyvinyl chloride, and chloroprene as such or blended with an olefin polymer having carbon black dispersed therein.

(3) Blends of resins such as polystyrene, styrene copolymers, butadiene-acrylonitrile copolymers, and polyester with an olefin polymer having carbon black dispersed therein.

With regard to the above materials (1), the materials lack strippability from the insulation layer as mentioned hereinbefore.

The above materials (2) have been proposed with the aim of improving the strippability thereof from the insulating layer. While their effectiveness in this respect is recognizable, they are accompanied by the following problems.

In order to suppress a dielectric breakdown phenomenon due to causes such as water tree in a cable insulated with crosslinked polyethylene, there is a trend toward changing the crosslinking system from the wet-crosslinking method to the dry-crosslinking method. In general, however, the crosslinking temperature in the dry crosslinking method is higher than that in the wet crosslinking method, whereby there is an even greater necessity for thermal stability at the time of fabrication of the outer semiconducting layer material. Under these circumstances, the halogen-containing resin, the high VAc content EVA, or the like generate corrosive gases due to thermal decomposition, at high-temperature which gases give rise to corrosion of equipment and corrosion of the shielding copper tape of the cable thereby becoming a cause of impairment of cable performance.

The above enumerated materials (3), similarly as in the case of the materials (2), are intended to improve the strippability of the semiconducting layer from the insulating layer, but in all cases, the compatibility thereof with olefin polymers is inadequate, and, moreover, there is the necessity of increasing the blend quantity of the first resin (polystyrene, for example) for improving the strippability. The resulting outer semiconducting layer thus tends to be fragile and subject to excessive peeling and breaking off of layer pieces, whereby these materials (3) are accompanied by problems in practical use.

We have studied the above described problems encountered in the prior art and have concluded that a satisfactory semiconducting resin composition for the instant purpose must fulfil the following requirements.

1. In the finished cable, the semiconducting resin composition layer must be in a state of intimate contact with the insulating layer.
2. The layer must be readily strippable from insulating layer depending on the necessity.
3. The resin composition must have excellent mechanical strength properties including flexibility and stretchability.
4. The dispersibility of the carbon black in the resin composition must be good.
5. The resin composition must have excellent moldability or extrudability.
6. The resin composition must have excellent thermal stability and must generate only a small quantity of corrosive gases when the resin composition undergoes thermal decomposition.

SUMMARY OF THE INVENTION

It is an object of this invention to provide semiconducting resin compositions which fully satisfy the above listed requirements.

According to this invention, briefly summarized, there is provided a semiconducting resin composition comprising: (A) 100 to 40 parts of a modified ethylenevinyl acetate copolymer which is a product of graft processing of 100 parts of an ethylene-vinyl acetate copolymer of a vinyl acetate content of less than 35 percent with 25 to 200 parts of an aromatic vinyl monomer; (B) 0 to 60 parts of a rubber; and (C) 3 to 150 parts of a carbon black with respect to 100 parts of the above described components (A) and (B), all quantities in "parts" and "percent" being by weight.

The nature, utility, and further features of this invention will become more apparent from the following detailed description beginning with a consideration of general aspects of the invention and concluding with specific examples of practice illustrating preferred embodiments thereof, reference examples, and comparison examples.

Throughout this disclosure, quantities expressed in "parts" and "percent" are by weight unless otherwise specified.

DETAILED DESCRIPTION OF THE INVENTION

Modified EVA, component (A)

An EVA which is used as the base resin in this invention has a vinyl content of from 5 parts to less than 35 parts and a melt index (MI), as specified by Japanese Industrial Standards (JIS) K-7210, of 0.5 to 200 grams (g) per 10 minutes.

The modification of the EVA by an aromatic vinyl monomer in this invention can be carried out by a "graft processing" such as melt grafting by means such as an extruder or grafting in a solution. One specific example of such a procedure is as follows.

100 Parts of EVA particles, 25 to 200 parts of an aromatic vinyl monomer, and 0.01 to 5.0 parts, with respect to 100 parts of the aromatic vinyl monomer, of a radical polymerization initiator are added to and dispersed by agitation in an aqueous medium, in a concentration such that the agitation can easily be carried out, in the presence of a suspending agent useable for aqueous suspension polymerization such as a soluble polymer or an inorganic powder material of low or no solubility.

In general, the particle size of the above mentioned EVA particles is 1 to 7 mm, preferably 2 to 5 mm. The decomposition temperature for obtaining a half-life of 10 hours of the above mentioned radical polymerization initiator is 50° to 130° C. Examples of the suspending agent are polyvinyl alcohol, polyvinylpyrrolidone, and methylcellulose. Examples of the inorganic powder material of low or no solubility are calcium phosphate and magnesium oxide. The above mentioned concentration, in general, is 5 to 100 parts of the EVA resin and the aromatic vinyl monomer per 100 parts of the water.

Thereafter, a polymerization processing is carried out, but, prior to this, this aqueous suspension is heated within limits wherein substantially no decomposition of the polymerization initiator used takes place thereby to cause the aromatic vinyl monomer to become impregnated in the resin particles.

For this impregnation treatment, a high heating temperature would appear to be desirable from the standpoint of promoting the impregnation. However, since the aromatic vinyl monomer prior to impregnation polymerizes by itself because of premature decomposition of the polymerization initiator, a lower heating temperature is desirable for preventing this, being preferably from room temperature to 50° C. Under this temperature condition, the aqueous suspension is left standing for 1 to 5 hours, preferably under agitation, until 80 percent or more, preferably 90 percent or more, of the aromatic vinyl monomer becomes impregnated in or adhering to the resin particles, that is, until the quantity of free liquid droplets of the aromatic vinyl monomer becomes less than 20 percent, preferably less than 10 percent.

When this quantity of free aromatic vinyl monomer is 20 percent or more, there is the possibility of separation of independent or non-grafted vinyl polymer particles, and, further, the dispersion of the vinyl polymer in the resin particles becomes nonuniform. In this connection, since the free aromatic vinyl monomer becomes impregnated within the resin particles or adheres to the surfaces of the resin particles and thus polymerizes in the succeeding polymerization process step, virtually no vinyl polymer particles can be found to exist independently of the EVA particles in the polymerization product.

The aqueous suspension prepared in this manner is further heated at a high temperature to bring about completion of the polymerization of the aromatic vinyl monomer, whereupon modified EVA particles are obtained. During this step, the heating temperature should be at a level such that ample decomposition of the polymerization initiator used occurs. This temperature, however, preferably should not exceed 130° C. We have found that when it exceeds 130° C., gel substances tend to be formed in the modified resin thus produced and that a heating temperature of 50° to 130° C. is suitable.

The aqueous graft processing of this type is disclosed in Japanese Patent Laid-Open Nos. 32990/1977, 50389/1977 and 50390/1977.

For the aromatic vinyl monomer, a styrene monomer of the formula

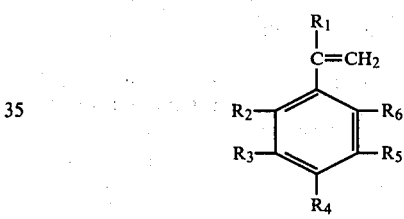

wherein $R_1$ is a hydrogen atom or an alkyl group having 1 to 4 carbon atoms, and each of $R_2$ through $R_6$ is a hydrogen atom, a chlorine atom, or an alkyl group having 1 to 4 carbon atoms, is used. Examples of such monomers are styrene, nucleus-substituted styrenes such as methylstyrene, isopropylstyrene, and chlorostyrene, and α-substituted styrene such as α-methylstyrene, and α-ethylstyrene. In addition, mixtures such as those of styrene and an acrylic ester, of styrene and a methacrylic ester, and of styrene and acrylonitrile are also useable. The mixtures of styrene and acrylonitrile are preferable when the rubber, the component (B), is a butadiene-acrylonitrile copolymer in view of the strippability of the layer made of the mixture.

For the polymerization initiator, one which is oil soluble is used in line with the technique of aqueous suspension polymerization. Furthermore, according to a characteristic of this invention, the polymerization initiator must have a decomposition temperature of 50° to 130° C. for obtaining a half-life of 10 hours. A range of this temperature of 55° to 110° C. is particularly preferred. When this temperature is less than 50° C., polymerization of the aromatic vinyl monomer occurs in the impregnation step, whereby a polymerization product of uniform quality will not be obtained. When this temperature is above 130° C., gels tend to produce in the polymerization product and impair the physical properties thereof. Tthis may be considered to be attributable to an intermolecular crosslinking reaction of the EVA resin resulting from excessive raising of the temperature.

Specific examples of useable polymerization initiators are octanoyl peroxide, benzoyl peroxide, cyclohexanone peroxide, tert-butylperoxybenzoate, methylethylketone peroxide, 2,5-dimethyl-2,5-dibenzoylperoxyhexane, di-tert-butyl-di-peroxyphthalate, lauroyl peroxide, tert-butylperoxypivalate, and 3,5,5-trimethylhexanoyl peroxide.

The quantity in which the polymerization initiator is used is 0.01 to 5.0 parts relative to 100 parts of the aromatic vinyl monomer.

In the modified EVA obtained in the above described manner, three components, namely, the EVA, the graft copolymer of the aromatic vinyl monomer onto the EVA, and the aromatic vinyl polymer, are existing in mixed state, the compatibility of the EVA and the aromatic vinyl polymer being improved by the presence of the graft copolymer, and the aromatic vinyl polymer is thus homogeneously and finely dispersed throughout the EVA matrix.

For this reason, even when the aromatic vinyl monomer unit is increased, the homogeneity of the polymerization product is not impaired, and a formed or molded product formed from the composition exhibits an excellent exterior appearance and excellent properties. In contrast, in a simple blend system of an EVA and an aromatic vinyl polymer, the dispersion is poor because of inadequate compatibility of the two components, and the delamination occurring in the forming or molding process stage gives rise to an impairment of the exterior appearance of the formed or molded product and a marked deterioration of the properties thereof (particularly its stretching characteristic and impact resistance), whereby the product cannot withstand actual use in practice.

Rubber, component (B)

Examples of the rubber for reinforcement and modification for use optionally but preferably in the composition of this invention are ethylene-propylene copolymer rubbers, styrene-butadiene copolymer rubbers, styrene-conjugated diolefin block copolymer rubbers, acrylonitrile-butadiene copolymer rubbers (NBRs), polyisoprene, polyisobutylene, isobutylene-isoprene copolymer rubbers, and 1,4-polybutadiene rubbers. Particularly preferable rubbers are ethylene-propylene copolymer rubbers, styrene-conjugated diolefin block copolymer rubbers, and NBRs. These three kinds of rubbers will now be considered in greater detail.

Ethylene-propylene copolymer rubbers

Among these rubbers are included two-component rubbers each formed from ethylene and propylene, three-component rubbers each formed from ethylene, propylene, and a diene. One or more kinds of these rubbers are used according to this invention. Examples of dienes which can be utilized in an ethylene-propylene-diene copolymer rubber are chain conjugated dienes such as 1,4-pentadiene, 1,4-hexadiene, 1,5-hexadiene, and 1,7-octadiene and cyclic unconjugated dienes such as dicyclopentadiene, ethylidene norbornene, 1,5-cyclooctadiene, and 5-methylene-2-norbornene.

Styrene-conjugated diolefin block copolymer rubbers

These are block elastomer rubbers each formed from an aromatic vinyl compound, typically represented by styrene, and a conjugated diolefin. Each of these rubbers is a thermoplastic block elastomer comprising a nonelastic polymer block A comprising the aromatic vinyl compound and an elastic polymer block B of the conjugated diolefin and having a block structure of $(A-B)_{n+1}$, $B-(A-B)_{n+1}$, or $A-(B-A)_n$, where n is an integer equal to 1 through 20.

The proportion of the block A in the total molecules is 1 to 50 percent. For the conjugated diolefin, 1,3-butadiene, isoprene, n-1,3-pentadiene, or the like is used. For the aromatic vinyl compound, styrene, methylstyrene, dimethylstyrene, or the like is used.

In addition, a thermoplastic block elastomer obtained by hydrogenating the conjugated diolefin polymer block is also applicable to this invention.

NBRs

For the acrylonitrile-butadiene copolymer in this invention, those of various different copolymerization proportions of the acrylonitrile and the butadiene can be used. More specifically, copolymers in which the quantity of the bound acrylonitrile is within the range of 15 to 50 percent, and which have Mooney viscosities of 20 to 140 are used. In addition, special acrylonitrile-butadiene copolymers such as carboxylated nitrile rubber formed by causing a small quantity of acrylic acid or methacrylic acid to copolymerize into an acrylonitrile-butadiene copolymer or a vinylpyridine terpolymer prepared by causing 2-methyl-5-vinylpyridine to copolymerize into an acrylonitrile-butadiene copolymer can also be used.

The rubbers for reinforcement and modification are used singly or in combinations of two or more thereof in a proportion of 0 to 60 parts, preferably 3 to 60 parts, with respect to 100 parts as a sum thereof together with the modified EVA.

The purpose of blending one or more of these rubbers is to reinforce the mechanical strength of the compositions in cases where there are many aromatic vinyl monomer units in the modified EVA (generally of the order of 40 parts or more), that is, in cases where the strippability is to be promoted, or in cases where the quantity of the added carbon black is large (generally of the order of 20 parts or more), that is, in cases where the electroconductivity level is to be further raised.

On this point, ethylene-propylene copolymer rubbers and styrene-conjugated diolefin block copolymer rubbers exhibit good compatibilities with respect to the modified EVA and have a markedly desirable effect on the mechanical strength.

Carbon black, component (C)

The term "carbon black" as used herein is intended to designate furnace black, acetylene black, channel black, ketjen black, and others. The carbon black is blended in a proportion of 3 to 150 parts per 100 parts of the components (A) and (B).

Optional Additives

Additives such as a crosslinking agent, a stabilizer, an antioxidant, and processing aids such as a lubricant can be blended in suitable quantities with the compositions of this invention in accordance with the conditions of use.

Compositions-preparation and Properties

The compositions of this invention can be readily produced by means of continuous-type extruders such as a single screw extruder and a twin screw extruder as well as batch-type mixing and kneading machines such as a Banbury mixer, a roll kneader, and a Brabender plastograph. There are no particular restrictions relative to the blending sequence. The materials to be blended may be mixed and kneaded together in a single step. In addition, it is also possible to first mix and knead the modified EVA or the rubber and the carbon black by means of a batch-type or continuous-type extruder and then to mix and knead the resulting mixture with the modified EVA or/and the rubber.

The semiconducting resin composition of this invention, which is particularly suited for use as the outer semiconducting layer or an insulated cable, has the following characteristic features.

1. The strippability of this composition with respect to the insulation layer is imparted by the use, not of a known high VA content EVA or halogen-containing resin, but of an EVA obtained by modifying a low VA content EVA with an aromatic vinyl monomer and, depending on the case, a resin system to which a rubber for reinforcement and modification has been added. This is a new method of imparting strippability.

2. The unit polymers comprised in the resin composition have excellent thermal stability and good moldability or extrudability. At the same time, only a small quantity of corrosive gas is generated by thermal decomposition.

3. Since the modified EVA has a structure wherein, as described hereinbefore, a vinyl polymer formed from an aromatic vinyl monomer is homogeneously dispersed in micron units in the EVA, it possesses very good mechanical properties in comparison with those of a halogen-containing resin or a simple blend system of polystyrene known in the prior art. Furthermore, since there is good blend compatability between the modified EVA and the components such as an ethylene-propylene copolymer rubber or a block elastomer rubber comprising a conjugated diolefin and an aromatic vinyl compound, a composition of excellent mechanical strength can be provided by suitably blending the rubber as a reinforcement in the case where there are many aromatic vinyl monomer units in the modified EVA or in the case where the content of added carbon black is high.

4. Since the composition of this invention entails no pellet blocking as observed in high VA content EVA, it has excellent workability at the time of compounding of carbon black or at the time of cable extrusion fabrication.

5. Carbon black is easily dispersed in the modified EVA used in the composition of this invention.

In order to indicate more fully the nature and utility of this invention, the following Reference Examples, specific Examples of practice, and Comparison Examples are set forth, it being understood that these examples are presented as illustrative only and that they are not intended to limit the scope of the invention.

In these examples, the stripping or peeling test was carried out in the following manner:

A sheet of the semiconducting resin composition and a sheet of polyethylene for insulation purposes, each of 1-mm thickness, 200-mm length, and 200-mm width, were formed by means of a compression forming machine under the forming conditions of a temperature of 120° C., a pressure of 100 kg/cm², and a time of 9 minutes. The polyethylene comprised 100 parts of low-density polyethylene of a density of 0.920 g/cc and an MI of 1.0 and, blended therein, 2 parts of a crosslinking agent (dicumyl peroxide) and 0.3 part of an anti-oxidant (4,4'-butylidene-bis(3-methyl-6-t-butyl phenol)).

These two sheets were placed in mutually superposed state and formed into a laminated sheet by pressing at 180° C. and 50 kg/cm² for 30 minutes by means of a compression forming machine.

From the laminated sheet thus obtained, test pieces each of 0.5-inch width and 150-mm length were punched out. Each test piece was subjected to a peeling test by means of a tensile testing machine.

This peeling test comprised peeling apart the sheet of the semiconducting resin composition from the sheet of the polyethylene for insulation purposes at an angle of 90° relative thereto, in an atmosphere of 23° C. and 65% RH, at a speed of 50 mm/minute. The force of resistance to this peeling action was taken as the peeling strength (kg/0.5 inch).

REFERENCE EXAMPLE 1

20 kg of pure water was placed in an autoclave of 50-liter (lit.) capacity, and 600 g of tribasic calcium phosphate as a suspending agent and 0.6 g of sodium dodecylbenzenesulfonate were added thereinto to form an aqueous medium, in which 6 kg of particles of 3-mm diameter of an EVA of a specific gravity of 0.95, an MI of 15.0, and a vinyl acetate content of 28 percent was suspended by agitation. Separately, as a polymerization initiator, 8 g of benzoyl peroxide and 4 g of t-butylperoxybenzoate were dissolved in 6 kg of styrene (100 parts with respect to 100 parts of EVA), and resulting solution was added to the above described suspension system. The interior temperature of the autoclave was raised to 45° C., at which the system was left standing for 3 hours thereby to cause the EVA particles to be impregnated by the styrene containing the polymerization initiator.

This aqueous suspension was heated to 80° C., at which it was held for 5 hours, and then held for a further 5 hours at 125° C. thereby completing the polymerization. It was confirmed that, the modified resin particles thus obtained contained the styrene polymer quantitatively in substantially the same quantity as the styrene used, that is, in a quantity of 100 parts.

REFERENCE EXAMPLE 2

The procedure of Reference Example 1 was carried out by using, as the base resin for modification, an EVA of a specific gravity of 0.943, an MI of 12.0, and a vinyl acetate content of 20 percent, and feeding instead of 100 parts of styrene 75 parts of styrene and 25 parts of acrylonitrile thereby to complete the polymerization. As a result, a styrene-acrylonitrile modified EVA of a styrene-acrylonitrile polymer content of 100 parts was obtained.

REFERENCE EXAMPLE 3

The procedure of Reference Example 1 was carried out with systems respectively using 25 parts and 200 parts of styrene instead of 100 parts of styrene thereby to obtain modified EVAs respectively of different styrene polymer contents.

By using the compositions comprising the respective components set forth in the following Examples and Comparison Examples, the aforedescribed peeling test and other measurements were carried out.

EXAMPLE 1

| | |
|---|---|
| Modified EVA of Reference Example 1: | 100 parts |
| [styrene polymer content, 100 parts] | |
| Carbon black: | 40 parts |
| [Vulcan XC-72, Cabot Corp., U.S.A.] | |
| Crosslinking agent: | 0.5 part |
| [dicumyl peroxide] | |
| Anti-oxidant: | 0.5 part |
| [tetrakis[methylene(3,5-di-t-butyl-4-hydroxy-hydrocynnamate)]methane] | |

EXAMPLE 2

| | |
|---|---|
| Modified EVA of Ref. Example 1: 80 parts | } 100 parts |
| Ethylene-propylene copolymer rubber: 20 parts | |
| [EP-07P, Nippon E.P. Rubber Co., Japan] | |
| Carbon black [same as Example 1]: | 40 parts |
| Crosslinking agent [same as Example 1]: | 0.5 part |
| Anti-oxidant [same as Example 1]: | 0.5 part |

EXAMPLE 3

| | |
|---|---|
| Modified EVA of Ref. Example 1: 80 parts | } 100 parts |
| Styrene-butadiene block copolymer rubber: 20 parts | |
| [Kaliflex TR-1102, Shell Kagaku K.K., Japan] | |
| Carbon black [same as Example 1]: | 40 parts |
| Crosslinking agent [same as Example 1]: | 0.5 part |
| Anti-oxidant [same as Example 1]: | 0.5 part |

COMPARISON EXAMPLE 1

| | |
|---|---|
| Base EVA used in Ref. Example 1: | 100 parts |
| [vinyl acetate content, 28%] | |
| GP-polystyrene: | 100 parts |
| [Dialex HF-77, Mitsubishi-Monsanto K.K., Japan] | |
| Crosslinking agent [same as Example 1]: | 0.5 part |
| Carbon black [same as Example 1] | 40 parts |
| Anti-oxidant [same as Example 1]: | 0.5 part |

COMPARISON EXAMPLE 2

| | |
|---|---|
| Base EVA used in Ref. Example 1: 80 parts | } 100 parts |
| GP-polystyrene [same as Comp. Example 1]: 20 parts | |
| Carbon black [same as Example 1]: | 40 parts |
| Crosslinking agent [same as Example 1]: | 0.5 part |
| Anti-oxidant [same as Example 1]: | 0.5 part |

COMPARISON EXAMPLE 3

| | |
|---|---|
| Base EVA used in Ref. Example 1: 60 parts | |
| GP-polystyrene [same as Comp. Example 1]: 20 parts | } 100 parts |
| Ethylene-propylene copolymer rubber [same as Example 1]: 20 parts | |

| | |
|---|---|
| Carbon black [same as Example 1]: | 40 parts |
| Crosslinking agent [same as Example 1]: | 0.5 part |
| Anti-oxidant [same as Example 1]: | 0.5 part |

EXAMPLE 4

| | |
|---|---|
| Modified EVA of Ref. Example 2: 80 parts | } 100 parts |
| Styrene-butadiene copolymer rubber: 20 parts | |
| [Tufprene, Asahi Kasei K.K., Japan] | |
| Carbon black [same as Example 1]: | 40 parts |
| Crosslinking agent [same as Example 1]: | 0.5 part |
| Anti-oxidant [same as Example 1]: | 0.5 part |

EXAMPLE 5

| | |
|---|---|
| Modified EVA of Ref. Example 2: | 100 parts |
| Carbon black: | 10 parts |
| [Ketjen black, Lion-Akzo K.K., Japan] | |
| Crosslinking agent [same as Example 1]: | 0.5 part |
| Anti-oxidant [same as Example 1]: | 0.5 part |

COMPARISON EXAMPLE 4

| | |
|---|---|
| Base EVA used in Ref. Example 2: | 100 parts |
| Acrylonitrile-styrene copolymer: | 25 parts |
| [Sanlex SAN-C, Mitsubishi-Monsanto K.K., Japan] | |
| Crosslinking agent [same as Example 1]: | 0.5 part |
| Anti-oxidant [same as Example 1]: | 0.5 part |

EXAMPLE 6

| | |
|---|---|
| Modified EVA of Ref. Example 3: | 100 parts |
| [styrene polymer content, 25 parts] | |
| Carbon black [same as Example 5]: | 10 parts |
| Crosslinking agent [same as Example 1]: | 0.5 part |
| Anti-oxidant [same as Example 1]: | 0.5 part |

EXAMPLE 7

| | |
|---|---|
| Modified EVA of Ref. Example 3: 70 parts | |
| [styrene polymer content, 200 parts] | } 100 parts |
| Styrene-butadiene copolymer rubber: 30 parts | |
| [same as Example 4] | |
| Carbon black [same as Example 5]: | 10 parts |
| Crosslinking agent [same as Example 1]: | 0.5 part |
| Anti-oxidant [same as Example 1]: | 0.5 part |

The results of measurements of the properties of the compositions of the above described Examples and Comparison Examples are set forth in Tables 1, 2, and 3.

As properties for evaluation, in addition to the aforementioned peeling strength, mechanical strength, appearance, and electroconductivity of each composition as an outer semiconducting layer material were measured.

TABLE 1

| | | Example 1 | Example 2 | Example 3 | Comp. Example 1 | Comp. Example 2 | Comp. Example 3 |
|---|---|---|---|---|---|---|---|
| Peeling strength | kg/0.5 | 2.0 | 1.5 | 1.5 | 4.0–5.0*[1] | 6.0< | 6.0< |

TABLE 1-continued

|  |  | Example 1 | Example 2 | Example 3 | Comp. Example 1 | Comp. Example 2 | Comp. Example 3 |
|---|---|---|---|---|---|---|---|
| Tensile strength | kg/cm$^2$ (inch) | 150 | 160 | 150 | 60> | 60> | 60> |
| Tensile elongation | % | 250 | 400 | 600 | 10> | 30> | 30> |
| Volume resistivity | Ω-cm | 75 | 110 | 80 | 10$^7$< | 245 | 600 |
| Appearance*$^2$ | — | o | o | o | x | Δ | x |

Note
*$^1$Adhering carbon residue on insulating PE surface.
*$^2$Deterioration of surface of extruded article due to delamination.
(o: good Δ: fair x: poor)

TABLE 2

|  |  | Example 4 | Example 5 | Comparison Example 4 |
|---|---|---|---|---|
| Peeling strength | kg/0.5 inch | 3.0 | 3.8 | 6.0< |
| Tensile strength | kg/cm$^2$ | 150 | 180 | 60> |
| Tensile elongation | % | 350 | 300 | 20> |
| Volume resistivity | Ω-cm | 125 | 65 | 10$^7$< |
| Appearance | — | o | o | x |

TABLE 3

|  |  | Example 6 | Example 7 |
|---|---|---|---|
| Peeling strength | kg/0.5 inch | 3.9 | 1.5 |
| Tensile strength | kg/cm$^2$ | 250 | 250 |
| Tensile elongation | % | 600 | 500 |
| Volume resistivity | Ω-cm | 80 | 120 |
| Appearance | — | o | o |

In addition, the following Examples and Comparison Examples are set forth.

EXAMPLE 8

| | | |
|---|---|---|
| Modified EVA of Ref. Example 1: | 80 parts | } 100 parts |
| Acrylonitrile-butadiene copolymer: [JSR NBR N230S (bound nitrile quantity, 35%)] | 20 parts | |
| Carbon black: [Denka acetylene black] | | 40 parts |
| Anti-oxidant: [tetrakis[methylene(3,5-di-t-butyl-4-hydroxy-hydrocynnamate)]methane] | | 0.1 part |

EXAMPLE 9

| | |
|---|---|
| Modified EVA of Ref. Example 1: | 48 parts |
| Base EVA used in Ref. Example 1: | 32 parts |
| [VAc quantity, 28%] | } 100 parts |
| Acrylonitrile-butadiene copolymer: [same as Example 8] | 20 parts |
| Carbon black [same as Example 8]: | 40 parts |
| Anti-oxidant [same as Example 8]: | 0.1 part |

COMPARISON EXAMPLE 5

| | | |
|---|---|---|
| Base EVA used in Ref. Example 1: | 80 parts | } 100 parts |
| Acrylonitrile-butadiene copolymer: [same as Example 8] | 20 parts | |
| Carbon black [same as Example 8]: | | 40 parts |
| Anti-oxidant [same as Example 8]: | | 0.1 part |

COMPARISON EXAMPLE 6

| | | |
|---|---|---|
| Base EVA used in Ref. Example 1: | 40 parts | |
| GP-polystyrene: [same as Comp. Example 1] | 40 parts | } 100 parts |
| Acrylonitrile-butadiene copolymer: [same as Example 8] | 20 parts | |
| Carbon black [same as Example 8]: | | 40 parts |
| Anti-oxidant [same as Example 8]: | | 0.1 part |

EXAMPLE 10

| | | |
|---|---|---|
| Modified EVA of Ref. Example 2: | 90 & 80 parts | } 100 parts |
| Acrylonitrile-butadiene copolymer: [JSR NBR N220S (bound nitrile quantity, 40%)] | 10 & 20 parts | |
| Carbon black [same as Example 8]: | | 40 parts |
| Anti-oxidant [same as Example 8]: | | 0.1 part |

The results of measurements of the properties of the compositions of the above described Examples 8, 9, and 10 and Comparison Examples 5 and 6 are set forth in Table 4.

TABLE 4

|  |  | Example 8 | Example 9 | Example 10 | | Comp. Example 5 | Comp. Example 6 |
|---|---|---|---|---|---|---|---|
| Peeling strength | kg/0.5 inch | 1.2 | 1.4 | 1.6 | 0.9 | 4.0 | 3.0-6.5*$^1$ |
| Tensile strength | kg/cm$^2$ | 180 | 150 | 180 | 160 | 85 | 60> |
| Tensile elongation | % | 250 | 300 | 200 | 240 | 190 | 80> |
| Volume resistivity | Ω-cm (23° C.) | 70 | 120 | 100 | 100 | 10$^7$< | 800 |
| Appearance | — | o | o | o Modified EVA 90 NBR 10 (parts | o Modified EVA 80 NBR 20 (parts | Δ*$^2$ | x*$^3$ |

TABLE 4-continued

| | Example 8 | Example 9 | Example 10 | Comp. Example 5 | Comp. Example 6 |
|---|---|---|---|---|---|
| | | | by wt) | by wt) | |

*[1] Adhering carbon residue on insulating PE surface.
*[2] Deterioration of surface of extruded article caused by unevenness due to poor dispersion.
*[3] Deterioration of surface of extruded article due to delamination.

As is apparent from Tables 1 through 4, each semiconducting resin composition of this invention possesses balanced properties fully satisfying the conditions for a semiconducting layer material with respect to strippability from an insulating polyethylene layer, mechanical strength, appearance, and electroconductivity. Furthermore, an EVA of low vinyl acetate content is used as the base resin, and the thermal stability at the time of forming operation is excellent, whereby an outer semiconducting layer material which is industrially effective and useful is provided.

In comparison with this invention, in the case of a blend system of an EVA and a polystyrene or of an EVA and a styrene-acrylonitrile copolymer, the compatability between the EVA and the styrene resin is poor, as indicated by the Comparison Examples. For example, when the blending quantity of the styrene resin is increased in order to obtain a desired peeling strength, a phenomenon of delamination occurs, and the material is remarkably fragile, being incapable of withstanding practical use.

For reference, the measurements of the properties other than the peeling strength of the compositions, the results of which are set forth in Table 1 through Table 4, were made according to the following methods.

1. The volume resistivity was measured in conformance with Nippon Gomu Kyokai Hyōjun Kikaku (Japan Rubber Association Standard Specification) 2301-1969, "Method of testing volume resistivities of electroconductive rubbers and plastics", by using a Wheatstone bridge type measuring instrument of Yokogawa Denki K.K., Japan.

2. The tensile strength was measured in conformance with Japanese Industrial Standards, JIS K-7113.

3. The appearance was evaluated by extruding and forming each composition into a strand of circular cross section of 3-mm diameter by means of a 40-mm diameter extruder and evaluating the state of the surface of extruded article (i.e., the presence or absence of unevenness and delimination).

What is claimed is:

1. A semiconducting resin composition useful as a semiconducting layer of an insulated electric cable comprising:
   (A) 100 to 40 parts of a modified ethylene-vinyl acetate copolymer which is a product of graft processing of 100 parts of an ethylene-vinyl acetate copolymer of a vinyl acetate content of less than 35 percent with 25 to 200 parts of an aromatic vinyl monomer;
   (B) 0 to 60 parts of a rubber; and
   (C) 3 to 150 parts of an electrically conductive carbon black selected from the group consisting of furnace black, acetylene black, and ketjen black with respect to 100 parts of the above described components (A) and (B), all quantities in "parts" and "percent" being by weight.

2. A semiconducting resin composition according to claim 1 in which the graft processing of the ethylene-vinyl acetate copolymer with the aromatic vinyl monomer comprises providing an aqueous dispersion of particles of the ethylene-vinyl acetate copolymer, the aromatic vinyl monomer, and a radical polymerization initiator, at least 80 percent by weight of the aromatic vinyl monomer having been impregnated in or adhered to the particles of the ethylene-vinyl acetate copolymer, and subjecting the aqueous dispersion to conditions conducive to initiating polymerization of the aromatic vinyl monomer.

3. A semiconducting resin composition according to claim 2 in which the aqueous dispersion is produced by heating at a temperature of room temperature to 50° C. an aqueous dispersion comprising particles of the ethylene-vinyl acetate copolymer, said aromatic vinyl monomer and the radical polymerization initiator, the decomposition temperature of said polymerization initiator for obtaining a half-life of 10 hours being 50° to 130° C., thereby to cause at least 80 percent by weight of the aromatic vinyl monomer to be impregnated in or to adhere to the particles of the ethylene-vinyl acetate copolymer, and in which the conditions conducive to initiating polymerization of the aromatic vinyl monomer comprise heating the aqueous dispersion at a temperature of 50° to 130° C.

4. A semiconducting resin composition according to claim 1 in which the aromatic vinyl monomer is a styrene monomer of the formula

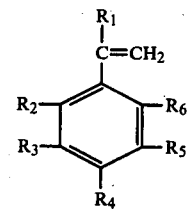

where $R_1$ is a hydrogen atom or an alkyl group having 1 to 4 carbon atoms, and each of $R_2$ through $R_6$ is a member selected from the group consisting of a hydrogen atom, a chlorine atom, and an alkyl group having 1 to 4 carbon atoms, and the rubber is a member selected from the group consisting of ethylene-propylene copolymer rubbers, styrene-conjugated diolefin block copolymer rubbers, and acrylonitrile-butadiene copolymer rubbers.

* * * * *